United States Patent Office 3,521,610
Patented July 28, 1970

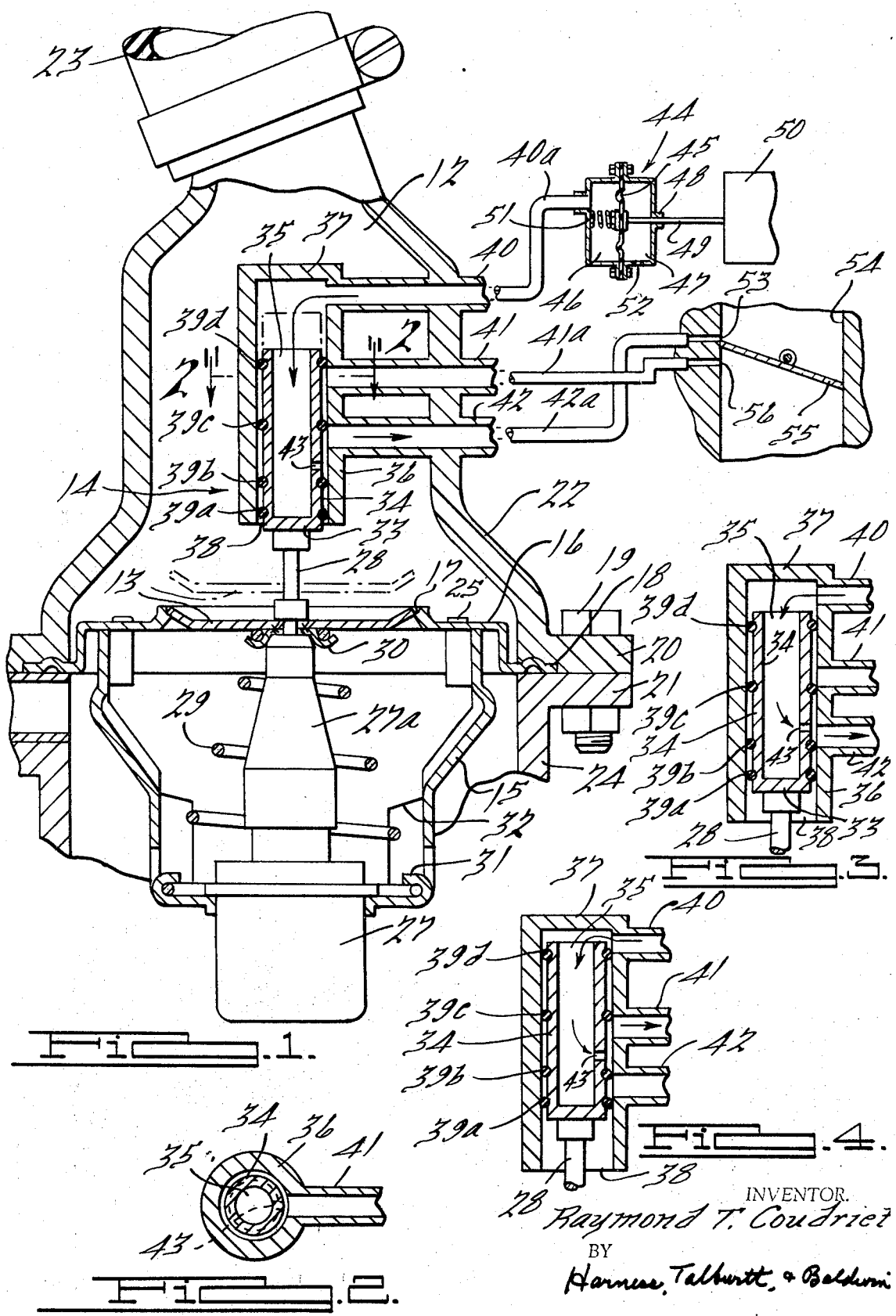

3,521,610
ENGINE TEMPERATURE CONTROL VALVE
Raymond T. Coudriet, Grosse Pointe Park, Mich., assignor to Chrysler Corporation, Highland Park, Mich., a corporation of Delaware
Filed June 11, 1968, Ser. No. 736,133
Int. Cl. F01p 7/16; F02p 5/12, 5/14
U.S. Cl. 123—117.1        10 Claims

ABSTRACT OF THE DISCLOSURE

A reciprocable temperature and pressure actuated valve for controlling the flow of coolant between a water cooled automobile engine and its radiator is connected with a manifold vacuum control valve to actuated the customary ignition timing mechanism to advance the ignition in the event of engine overheating during idling.

BACKGROUND OF THE INVENTION

This invention relates to improvements in a fluid pressure and temperature actuated valve for controlling the flow of fluid coolant through the cooling system of an engine, as for example a water cooled automobile engine wherein the coolant temperature is a measure of engine temperature, so as to increase the coolant flow progressively with increasing temperature, and for controlling the timing of the engine ignition to advance the ignition at a predetermined upper temperature while the engine is idling to prevent engine overheating during idle operation.

In such engines the coolant is usually circulated through the cooling system by means of an engine driven pump which creates a pressure differential across the valve as a function of engine speed. The engine operating temperature tends to increase with engine speed, so that it is usually desirable with increasing speed to increase the rate of coolant circulation between the engine and a heat dissipating radiator, but to maintain the coolant flow control valve closed during cold engine operation.

It is also common in such engines to retard the engine ignition during idling, whereby a greater total quantity of fuel may be supplied to the engine at an appreciably leaner fuel to air ratio than would otherwise be feasible, thereby to optimize combustion during idle operation and to minimize the exhausting of unburned hydrocarbons. The increased idle fuel consumption increases the problem of dissipating the engine idle heat and necessitates a cooling system of greater capacity. Even with an enlarged cooling system, prolonged idling, as for example in bumper-to-bumper traffic, tends to cause engine overheating particularly during conditions of high ambient temperature. In order to prevent such overheating without recourse to an unreasonably expensive cooling system, a temperature responsive valve has been employed to control an engine manifold vacuum actuated ignition or distributor spark advance mechanism to advance the ignition when the engine attains said predetermined upper temperature. In consequence, the engine idle speed is increased slightly and the operating efficiency for the coolant system is increased substantially by reason of an increased rate of coolant flow and an increased air flow from the customary engine driven fan. These factors among others result in cooler engine operation.

SUMMARY

An important object of the present invention is to provide an improved fluid pressure and temperature actuated valve means which both controls the flow of coolant in the automobile coolant system in accordance with temperature and engine operation and operates to advance the ignition timing when the temperature exceeds a predetermined value during engine idling, without effecting the timing during operation of the automobile at other than idle conditions.

Another object is to provide such a valve which is simple, compact, and economical in construction and which employs a single temperature responsive power unit for controlling both the coolant flow and the ignition timing at idle.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a schematic fragmentary view of an automobile engine cooling system and carburetor embodying the present invention, showing the valve in the cold position.

FIG. 2 is a sectional view through the manifold vacuum control valve member of FIG. 1, taken in the direction of the arrows substantially along the line 2—2 of FIG. 1.

FIGS. 3 and 4 are fragmentary views similar to FIG. 1, showing the manifold vacuum control valve in positions for normal and overheated temperature conditions.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENT

Referring to the drawings, a particular embodiment of the present invention is illustrated by way of example with an automobile internal combustion engine having a conventional liquid coolant duct system connected by means of a duct or passage 12 with an air cooled radiator. Heated liquid coolant, which may comprise water containing a suitable anti-freeze, is discharged from the engine via passage 12, is cooled in its passage through the radiator, and is returned to the engine at the low pressure side of an engine driven coolant pump which operates to circulate the coolant toward the high pressure underside of a temperature and pressure responsive disc type coolant control valve member 13 within passage 12. The structure and operation of the mechanism described thus far may be conventional.

The valve member 13 is part of a valve assembly 14 comprising a suitable housing 15 secured to an upper annular flange 16 which terminates inwardly in an annular valve seat 17. The latter defines a portion of the passage 12 and cooperates with valve member 13 to regulate the flow of coolant. Radially outwardly, the flange 16 is offset to provide an integral annular flange 18 which is clamped by bolts 19 between mating flanges 20 and 21 respectively of an upper coupling 22 (for a flexible hose section 23 of the duct 12) and a portion of the cylinder head casting 24 of the engine. A plurality of tabs 25 of the housing 15 extend through and are formed over the flange 16 to secure the latter to the housing 15.

A thermal responsive element of the valve 14 comprises a sealed housing 27 of suitable heat conducting material such as copper and contains a homogeneous mixture of a thermosensitive plastic and copper foil or powder. The thermosensitive plastic is adapted to expand or contract when heated or cooled respectively and the copper powder enhances the thermal conductivity of the mixture, which may be conventional in temperature responsive elements of the type shown.

A push rod 28 extends upwardly in slidable and guided relationship through a reduced guide portion 27a of the housing 27 and also through the circular disc valve member 13, to which it is secured in fluid sealing engagement for movement as a unit therewith and to prevent axial leakage of fluid along the rod 28 past valve member 13. A conical helical biasing spring 29 normally urges the valve member 13 downwardly to a closed position seated against the valve seat 17 and is retained at its opposite ends under tension between an upper retainer 30 and a plurality of tabs 31 formed inwardly from the housing 15 around the lowermost spiral of the spring 29. The retainer 30 is secured as for example by welding to the underside of valve member 13 for movement as a unit therewith coaxially with plunger 28. Fluid pressure from the coolant pump gains access to the underside of valve member 13, so as to urge the latter upwardly against the force of biasing spring 29, by means of openings 32 in the housing 15, as well as by means of the openings remaining after the formation of the tabs 31.

The upper end of rod 28 is removably secured as for example by a screw threaded connection to the closed underside 33 of a hollow cylindrical spool type vacuum control valve member 34 for reciprocation as a unit therewith. The upper end 35 of valve member 34 opens into the interior of a tubular valve cylinder 36 closed at its upper end 37. The lower end of cylinder 36 opens at 38 to receive the valve member 34 reciprocably therein.

Four lands of the valve member 34, comprising in the present instance O-ring seals 39a, 39b, 39c and 39d, extend coaxially around the valve 34 at axially spaced locations in sealing engagement therewith and the interior of cylinder 36, so as to prevent axial flow of fluid in the space therebetween. The O-rings 39a–d are partially recessed into the outer sidewall of valve member 34 so as to move axially as a unit therewith and to prevent their inadvertent axial displacement thereon.

Formed integrally with coupling 22 and cylinder 36 to support the latter and opening into the cylinder 36 at axially spaced locations are three radially extending conduits 40, 41 and 42 which are selectively connected with the interior of valve member 34 by means of a radial port 43 in the latter. The upper conduit 40 is connected by a flexible coupling 40a with the vacuum side of a distributor vacuum advance mechanism 44 partitioned by a flexible diaphragm 45 into a sealed chamber 46 (in communication with the conduit 40a) and a guide chamber 47 which provides a central guide bushing 48 through which a coaxial plunger 49 reciprocates. The left end of plunger 49 is secured centrally to the diaphragm 45 for reciprocation thereby and the right end of plunger 49 is secured to a conventional automobile engine ignition timing mechanism 50. A coil spring 51 under compression between the sidewall of chamber 46 and diaphragm 45 resists vacuum induced leftward movement of diaphragm 45 and normally maintains the latter at the retarded spark or ignition position shown when the engine is operating either at the desired warm idle condition or at cooler temperatures. A port 52 in the sidewall of chamber 47 communicates with the atmosphere to facilitate vacuum actuation of diaphragm 45.

Conduit 42 is connected by a flexible conduit 42a with the conventional distributor vacuum advance port 53, which opens into the interior of the customary carburetor fuel-air induction conduit 54 at a location adjacent and immediately upstream of the customary throttle valve 55 when the latter is in the idle position shown. Thus the port 53 is at a slightly reduced pressure during idle by reason of controlled leakage of air around the throttle valve 55, but this slightly reduced pressure is insufficient to actuate diaphragm 45 against the force of spring 51.

Conduit 41 is connected by a flexible conduit 41a with a low pressure port 56 which opens into induction conduit 54 at a location downstream of throttle valve 55, so as to actuate diaphragm 45 when in commounication with chamber 46 during engine idling as described below.

In operation, when the engine is cold and idling, the coolant pump will assert fluid pressure against the underside of valve 13, tending to open the latter, but spring 29 will hold the valve 13 at the closed position seated at the valve seat 17, FIG. 1. The valve 13 then cooperates with flange 16 to close passage 12. In this regard, the connections between valve 13 and rod 28 and also between flange 16 and housing 15 at the tabs 25 are substantially fluid tight. A portion of the coolant will bypass the radiator and will be circulated through the pump via a customary bypass.

As the engine heat progressively warms the coolant, the temperature sensitive mixture in element 27 will expand, tending to urge the rod 28 and valve 13 upwardly in the opening direction with increasing force against the reaction of spring 29. Finally at a predetermined low temperature which may be in the neighborhood of 10° F. below the desired warm operating temperature which obtains optimum conditions for engine idling with the minimum exhausting of unburned hydrocarbons, as for example at about 180° F., the valve 13 will be unseated from the valve seat 17 against the force of spring 29, thereby to open a restricted passage in the conduit 12 to the radiator. Valve 13 will continue to open thereafter with increasing temperature until the coolant temperature rises approximately another 10° F. corresponding to the desired warm engine idling temperature, as for example about 190° F., whereat the increased flow of coolant through the radiator will reduce the rate of temperature rise and the rod 28 will have moved valve 34 upwardly to a normal idle operating position between those shown in FIGS. 1 and 3.

The axial spacing of the seals 39a–d with respect to the conduits 40, 41 and 42 is determined so that throughout the above described engine idling within the cold and warm temperature ranges, the conduit 42 will communicate with cylinder 36 and port 43 at a location between seals 39b and 39c, conduit 41 will communicate with cylinder 36 between seals 39c and 39d and will thereby be closed to conduits 40 and 42, and conduit 40 will communicate with cylinder 36 at a location above seal 39d, so as to connect the conventional distributor vacuum advance port 53 with vacuum chamber 46 via port 43 and the hollow valve 34 and cylinder 36. The low pressure at port 53 during engine idling is insufficient to move diaphragm 45 against the force of spring 51, which maintains the ignition in a retarded idle condition, as aforesaid, amounting to approximately 10° after top dead center of the engine piston.

In the event of prolonged engine idling, the engine temperature will gradually rise above the desired warm idling condition. Plunger 28 will correspondingly move upwardly so as to increase the opening of valve 13 and to move valve 34 toward the position of FIG. 3, which may correspond to a predetermined upper limiting temperature for engine idling at the maximum condition of retarded ignition. Thereafter, upon continued heating of the engine during idling to the lower end of an overheated temperature range, upward movement of valve 34 to positions between those shown in FIGS. 3 and 4 will connect conduits 41 and 42, thereby directly connecting ports 53 and 56 so as to lower the pressure in conduit 42, and conduit 40 via port 43, to an extent determined by the relative restrictions at ports 53 and 56 and their associated conduits.

Where desired, this reduction in pressure communicated to chamber 46 may be adequate to move diaphragm 45 leftward against the reaction of spring 51 to effect an intermediate spark advance, increase the engine speed, and thereby increase the effectiveness of the engine cooling system by increasing the speeds of the engine driven fan (which circulates air through the radiator to increase its cooling effectiveness) and the engine driven water or coolant pump which circulates the coolant through the radiator.

On the other hand, the range of positions of valve 34 between those shown in FIG. 3 and FIG. 4 may be employed as a dwell range whereat moderate heating of the engine above the desired warm operating temperature does not immediately result in an advance of the ignition timing. In the latter event spring 51 will be adequate to prevent leftward movement of diaphragm 45 in response to the reduced pressure in chamber 46 during the interval of valve operation when conduits 41 and 42 are in communication with each other.

In any event, when idle overheating continues to the extent that valve 34 rises to the position of FIG. 4, whereat the low pressure of port 56 is communicated directly through conduits 41a, 41 and port 43 to chamber 46 via conduit 40, the vacuum induced leftward movement of diaphragm 45 will advance the ignition sufficiently to increase the speed of engine idle operation (as for example to approximately 5° or 10° before top dead center) and thereby to prevent additional temperature rise regardless of prolonged idling.

It is to be noted that conduit 42 is sealed in FIG. 4 from conduits 40 and 41 and from the coolant in conduit 12 by means of seals 39a and 39b. Also the operation of valve 34 has no effect on ignition timing except during engine idling because in the open position of throttle 55, the ports 53 and 56 are at substantially the same pressure and a normal vacuum induced advance of the ignition will take place with increased engine speed as has been customary heretofore.

During operation at engine speeds greater than idle, the increased speed of the coolant pump will tend to force valve 13 upwardly regardless of the engine temperature. In the latter regard, rod 28 is freely movable upwardly independently of the thermally induced expansion of the mixture in element 27, as is customary in such structures. The increased fuel consumption necessary to maintain the increased speed will cause the engine temperature to rise rapidly to the desired operating level.

In many conventional coolant control valves, the direction of coolant flow through conduit 12 to the radiator is reversed from that illustrated in FIG. 1. Thus the coolant pressure force will be applied to the upper surface of valve 13, urging the latter to the closed position with increasing force as the engine speed increases. In these situations, the valve 34 will still operate as described above during engine overheating at idle to advance the ignition.

I claim:
1. In a temperature and pressure responsive means for controlling the temperature of a fluid cooled automobile engine, the combination of
passage means for conducting engine cooling fluid,
valve means shiftable within said passage means for controlling the flow of said fluid therein,
biasing means for yieldingly urging said valve means to a normally closed position to close said passage means,
shiftable temperature responsive means for progressively moving said valve means against the force of said biasing means in an opening direction from said closed position when said temperature increases above a predetermined low temperature defining a cold engine operating condition,
second valve means having a valve element connected with said first valve means for shifting in unison therewith,
a fuel-air induction conduit for said engine,
a throttle valve in said induction conduit shiftable to idle and open positions,
a low pressure port opening into said induction conduit downstream of said throttle valve at the idle position,
pressure actuated means, and
conduit means cooperable with said second valve means for interconnecting said low pressure port and pressure actuated means when said temperature responsive means is at positions corresponding to temperatures above a predetermined overheated condition, said pressure actuated means being responsive to the pressure in said induction conduit at said port for advancing the ignition of said engine when said throttle is at its idle position.

2. In the combination according to claim 1, said throttle valve comprising a blade having leading and trailing edges movable respectively upstream and downstream within said induction conduit upon opening of said throttle valve from its idle position, and ignition advance port opening into said induction conduit immediately adjacent and on the high pressure side of said leading edge at said idle position, second conduit means cooperable with said second valve means for interconnecting said ignition advance port and pressure actuated means when said temperature responsive means is at all positions corresponding to temperatures below said predetermined overheated condition and said pressure actuated means being also responsive to the pressure in said induction conduit at said ignition advance port for advacing said ignition upon opening of said throttle valve from said idle position to move said leading edge upstream of said ignition advance port.

3. In the combination according to claim 2, said second valve means being within said passages means, the first named and second valve means being movable linearly with increasing temperature in the same direction as the fluid flow in said passage means.

4. In the combination according to claim 2, the first named valve means and said valve element being movable linearly within said passage means and the direction of opening movement of said first named valve means being in the direction of said fluid flow.

5. In the combination according to claim 4, the first named valve means and said valve element being movable linearly within said passage means, said first named valve means having a plunger extending in the direction of its linear movement and being secured to said valve element for operation in unison therewith.

6. In the combination according to claim 2, means on said second valve means cooperable with the first named and second conduit means for interconnecting said low pressure and ignition advance ports when said temperature responsive means is within a limited range of positions corresponding to temperatures between the first named overheated condition and a predetermined second higher temperature.

7. In the combination according to claim 6, means on said second valve means for connecting only said low pressure port with said pressure actuated means when said temperature responsive means is at positions corresponding to temperatures above said second higher temperature.

8. In the combination according to claim 7, means yieldingly urging said pressure actuated means to effect a retardation of said ignition and being yieldable to effect an initial advance of said ignition, when said throttle valve is at said idle position and said second valve means is operated to connect said low pressure and ignition advance ports, and to increase the advance of said ignition when said throttle valve is at said idle position and said second valve means is operated to connect only said low pressure port with said pressure actuated means.

9. In the combination according to claim 6, means on said second valve means cooperable with the first named and second conduit means for interconnecting said low pressure and ignition advance ports only when said temperature responsive means is within a limited range of positions corresponding to temperatures between the first named overheated condition and a predetermined second higher temperature.

10. In the combination according to claim 9, means yieldingly resisting actuation of said pressure actuated means with sufficient force to prevent the advancing of said ignition when said throttle valve is at said idle position and said second valve means is operated to connect said low pressure and ignition advance ports.

References Cited

UNITED STATES PATENTS

| | | | |
|---|---|---|---|
| 3,301,242 | 1/1967 | Candelise | 123—117.1 |
| 3,400,698 | 9/1968 | Kelly | 123—117.1 |

MARK M. NEWMAN, Primary Examiner

U.S. Cl. X.R.

123—41.05, 41.08